(12) United States Patent
Nakhasi et al.

(10) Patent No.: US 6,793,959 B2
(45) Date of Patent: Sep. 21, 2004

(54) LOW VISCOSITY STRUCTURED LIPID PAN RELEASE COMPOSITIONS AND METHODS

(75) Inventors: Dilip K. Nakhasi, Bourbonnais, IL (US); Roger L. Daniels, Manhattan, IL (US)

(73) Assignee: Bunge Foods Corporation, Bradley, IL (US)

( * ) Notice: Subject to any disclaimer, the term of this patent is extended or adjusted under 35 U.S.C. 154(b) by 242 days.

(21) Appl. No.: 10/100,449

(22) Filed: Mar. 18, 2002

(65) Prior Publication Data

US 2003/0175404 A1 Sep. 18, 2003

(51) Int. Cl.$^7$ ................................................. A23D 9/00
(52) U.S. Cl. ....................... 426/609; 426/606; 426/112; 426/811; 106/243; 106/244
(58) Field of Search ................................. 426/609, 811, 426/601, 606, 112; 106/243, 244

(56) References Cited

U.S. PATENT DOCUMENTS

| | | | |
|---|---|---|---|
| 2,796,363 A | 6/1957 | Lalone | |
| 2,849,323 A | 8/1958 | Young | |
| 2,952,547 A | 9/1960 | Hill | |
| 3,038,816 A | 6/1962 | Drell et al. | |
| 3,072,487 A | 1/1963 | Webster | |
| 3,366,494 A | 1/1968 | Bower et al. | |
| 3,490,923 A | 1/1970 | Eiseman, Jr. | |
| 3,661,605 A | 5/1972 | Rubin et al. | |
| 4,108,678 A | 8/1978 | Szuhaj et al. | |
| 4,371,451 A | 2/1983 | Scotti et al. | |
| 4,425,164 A | 1/1984 | Bliznak et al. | |
| 4,501,764 A | 2/1985 | Gercama et al. | |
| 4,605,563 A * | 8/1986 | Heine et al. | 426/607 |
| 4,654,220 A * | 3/1987 | Heine et al. | 426/609 |
| 4,832,975 A | 5/1989 | Yang | |
| 4,849,019 A | 7/1989 | Yasukawa et al. | |
| 5,142,071 A | 8/1992 | Kluesener et al. | |
| 5,288,512 A | 2/1994 | Seiden | |
| 5,370,732 A | 12/1994 | Follmer | |
| 5,374,434 A | 12/1994 | Clapp et al. | |
| 5,380,544 A | 1/1995 | Klemann et al. | |
| 5,395,629 A | 3/1995 | Bertoli et al. | |
| 5,407,695 A | 4/1995 | Wheeler et al. | |
| 5,434,278 A | 7/1995 | Pelloso et al. | |
| 5,468,507 A * | 11/1995 | Czap | 426/99 |
| 5,503,855 A | 4/1996 | Hidaka et al. | |
| 5,503,866 A | 4/1996 | Wilhelm, Jr. | |
| 5,567,456 A | 10/1996 | Clapp et al. | |
| 5,661,180 A | 8/1997 | DeMichele et al. | |
| 5,662,956 A | 9/1997 | Knightly | |
| 5,849,939 A | 12/1998 | Mittelbach et al. | |
| 5,888,947 A | 3/1999 | Lambert et al. | |
| 5,908,655 A | 6/1999 | Doucet | |
| 5,965,755 A | 10/1999 | Sernyk et al. | |
| 6,013,665 A | 1/2000 | DeMichele et al. | |
| 6,123,977 A * | 9/2000 | Diamond | 426/601 |
| 6,124,486 A | 9/2000 | Cherwin et al. | |
| 6,160,007 A | 12/2000 | DeMichele et al. | |
| 6,169,190 B1 | 1/2001 | Lanuza et al. | |
| 6,210,743 B1 | 4/2001 | Clapp et al. | |
| 6,238,926 B1 | 5/2001 | Liu et al. | |
| 6,277,432 B1 | 8/2001 | Chang | |
| 6,278,006 B1 | 8/2001 | Kodali et al. | |
| 2002/0001660 A1 | 1/2002 | Takeuchi | |

OTHER PUBLICATIONS

Heydinger and Nakhasi, "Medium Chain Triacyglycerols", *Journal of Food Lipids*, pp. 251–257, 1996.

Traul, et al., "Review of Toxicologic Properties of Medium–chain Triglycerides", *Food and Chemical Toxicology*, pp. 79–98, 2000.

Ingle, et al., "Dietary Energy Value of Medium–chain Triglycerides", *Journal of Food Science*, vol. 64, No. 6, 1999.

Specification on Natreon Oil, The naturally stable canola oil. Date Unknown.

Stepan Product Bulletin, Food Ingredients Department. Jul., 1996.

* cited by examiner

*Primary Examiner*—Carolyn Paden
(74) *Attorney, Agent, or Firm*—Cook, Alex, McFarron, Manzo, Cummings & Mehler Ltd.

(57) ABSTRACT

Medium chain triglyceride oils are interesterified with long chain domestic oils in order to form interesterified structured lipids. These structured lipids find special application in pan release cooking compositions and methods. The products have a relatively low viscosity of between about 20 and about 52 centipoise while having a smoke point which is especially suitable for cooking applications.

38 Claims, No Drawings

LOW VISCOSITY STRUCTURED LIPID PAN RELEASE COMPOSITIONS AND METHODS

BACKGROUND OF THE INVENTION

1. Field of the Invention

This invention generally relates to structured lipids which are especially suitable for use as edible oil components having a relatively low viscosity. More particularly, the invention relates to structured lipids for use as pan release components or in pan release products, especially such components or products which are applied by spraying onto a cooking surface and which have a smoke point which is suitable for cooking applications.

2. Description of Related Art

Vegetable-based edible oil compositions long have been used in cooking applications. Edible oil products provide taste, nutrition and anti-stick properties for any number of pan cooking, baking or similar types of uses and applications. Edible oil products of this general type include margarines, whipped spreads, tub margarines, shortenings, oils and sprayable compositions. Room temperature viscosities of these products vary depending upon the composition and the intended end use. Some such end uses require a viscosity low enough to permit propelling of the composition by an aerosol unit, a pump assembly, or other means for dispensing in a spray or mist pattern, whether for use in home kitchens, commercial kitchens, or on industrial cooking or baking lines. Products which are dispensable in these manners are referred to herein as pan release products or pan release compositions.

In the pan release art, references such as Rubin et al. U.S. Pat. No. 3,661,605 teach a surface release product in the form of an aerosol composition which is dispensed onto a cooking surface intended to be heated for food cooking purposes. This so-called pan release composition contains lecithin in a water dispersion, together with an aerosol propellant and a preservative which can be a vegetable oil and a fatty acid ester in relatively low quantities. When a typical product of this type is sprayed onto a cooking surface, the objective is to have a non-stick film of hydroxylated lecithin formed on the cooking surface. While products of this type have proven to be successful, improvements have been sought in these types of products, and this invention provides means for improving pan release products.

The present invention provides a novel type of pan release component or product which incorporates interesterification technology to provide pan release products that have multiple advantageous properties which are desired for pan release applications. These include a smoke point which is adequate to perform properly in various types of cooking applications. It is often difficult to obtain an adequately high smoke point in a product which must be thin enough to be sprayable. It is also important that pan release products exhibit a lightness in color so as to not detract from the appetizing appearance of the food or the like being cooked or baked with the pan release product.

Medium chain triglyceride (MCT) edible oils are known in the art including Seiden U.S. Pat. No. 5,288,512, Bertoli et al. U.S. Pat. No. 5,395,629, Hidaka U.S. Pat. No. 5,503,855 Takeuchi U.S. Patent Publication No. 2002/0001660, and Heydinger and Nakhasi, "Medium Chain Triacylglycerols, *Journal of Food Lipids*, 3, pages 251–257 (1996). Each of the publications and patents noted throughout herein are incorporated by reference hereinto.

Publications such as these define these medium chain triglyceride or medium chain triacylglycerol (MCT) compounds as being a class of lipids of glycerol ester fatty acids. MCTs are esters of glycerol with medium chain fatty acids of 6 to 12 carbon chain lengths. Sources typically are lauric oils. Coconut and palm kernel oils contain significant quantities of C8 (caprylic) and C10 (capric) chains. Often, isolated fractions of C8 and C10 acids contain small amounts of C6 and C12 acids as well. Generally, MCT esters are unsaturated. Accordingly, the primary components of MCT edible oils have C8:0 and C10:0 fatty acid chains.

Interesterification is a known reaction of triacylglycerol structures whereby individual positions of interesterified fatty acids are interchanged on the glycerol moiety. This is at times referred to or recognized as a randomization wherein fatty acid moieties from one glycerol component are exchanged with those of another glycerol component. The result is glycerol moieties which have interchanged fatty acid moieties which vary from glycerol structure to glycerol structure. Art in this area includes Pelloso et al. U.S. Pat. No. 5,434,278, Doucet U.S. Pat. No. 5,908,655, Cherwin et al. U.S. Pat. No. 6,124,486 and Liu et al. U.S. Pat. No. 6,238,926.

The art of interesterification has developed to provide, for example, triglyceride compositions which provide certain melt profiles which can be of interest in certain applications. Generally these are recognized as structured lipids in order to help distinguish the interesterified products from physical blends of the same components which have not been subjected to interesterification.

Heretofore, it has not been appreciated that the combination of interesterification technology and MCT technology would be especially advantageously applied to the task of improving pan release compositions. An especially important problem in this regard, which is addressed by interesterified components according to the invention, is to provide a composition that has a water-like viscosity to enable even aerosol spraying while simultaneously having a smoke point high enough to provide excellent pan cooking or baking characteristics.

SUMMARY OF THE INVENTION

In accordance with the present invention, products are provided which have viscosities that are advantageously low and smoke points that are high in order to satisfy in an exceptional manner the needs of pan release cooking products. These products have as a principal component a structured lipid which is a product of the interesterification of an edible domestic oil and a medium chain triglyceride. These structured lipids can be formulated in conjunction with components of a type typically included within pan release compositions, such as propellants, lecithin, and other suitable components in this regard. The structured lipids have a relatively low viscosity of between about 20 at about 52 centipoise, together with a smoke point of between at least about 195° C. and about 221° C. (at least about 383° F. and about 430° F.).

A general object of the present invention is to provide low viscosity structured lipids which have a viscosity suitable for dispensing in a spray pattern and which have a smoke point suitable for cooking.

An aspect or object of the present invention is that it provides medium chain triglycerides which have been modified by longer chain edible oils, which has been found to reduce viscosity and enhance smoke points when compared with blends of the same MCT and longer chain components.

Another aspect of this invention is that it provides structured lipids displaying a solids fat content which is substantially liquid at 10° C., which solids fat content is very appropriate for pan release cooking uses.

Another aspect of the present invention is providing an interesterification process for accomplishing randomized interesterification of medium chain edible oils with long chain edible oils and the use of the resulting product in pan release contexts.

Other aspects, objects and advantageous of the present invention will be understood from the following description according to the preferred embodiments of the present invention.

DESCRIPTION OF THE PREFERRED EMBODIMENTS

The present invention is directed toward structured lipids produced from medium chain triglycerides. Medium chain triglycerides usually are produced commercially by splitting and distilling fatty acids from coconut or palm kernel oils. Production includes esterification with glycerin to form a triglyceride having fatty acid chain lengths of from C6 to C12. These known edible oils typically contain 50 to 80 weight percent of C8 caprylic fatty acids and between about 20 and about 50 weight percent of C10 capric fatty acids. Minor levels, typically between about 1 and about 2 weight percent, of either or both of C6 caproic fatty acids and C12 lauric fatty acids can be present in some such products.

Known MCT products include some NEOBEE® products such as NEOBEE® M-5 (trademark and product of Stepan Company), CAPTEX® 300 (trademark and product of Abitec Corp.), and MIGLYOL® 812 (trademark and product of Clionova, Inc.). Traul et al., "Review Of The Toxicologic Properties Of Medium-Chain Triglyceride", *Food and Chemical Toxicology*, 38, pages 79–98 (2000) indicate that MCTs are essentially non-toxic in acute toxicity tests conducted in several species of animals. This article also indicates that MCTs exhibit virtually no ocular or dermal irritant potential, even with prolonged eye or skin exposure. This article also indicates that MCTs exhibit no capacity for hypersensitivity induction. According to this publication, the safety of MCTs in human dietary consumption has been indicated up to levels of 1 g/kg.

Another publication indicates that MCTs result in lower fat deposition when compared with long chain triglycerides. This is noted in Ingale et al., "Dietary Energy Value of Medium-Chain Triglycerides", *Journal of Food Science*, Volume 64, No. 6, pages 960–963 (1999). Conclusions reached in this article state that differences in energy utilization show that increments of heat associated with the metabolism of MCTs appears to be about 16% higher as compared to long chain triglycerides. With this in mind, the calculated mean net caloric energy value for MCTs used in diets is on the order or 6.8 kcal/g. This is lower than typical LCTs. According to the publication, substituting MCTs for LCTs as the source of fat in diets show reduced weight gain and reduced fat deposition in laboratory animals and humans. This is said to be due to the lower gross energy density of an efficient utilization of energy from MCTs.

From this information, medium chain triglycerides are indicated as having dietary advantages at least from the point of view of fat deposition. Medium chain triglycerides also are indicated by art such as this as being suitable for use in the context of human food applications. MCTs however have relatively high viscosities and low smoke points, making them less than satisfactory for pan release uses.

Interesterification of these MCTs according to the invention includes charging them to an interesterification location or vessel as part of the charge for forming the structured lipid. Typically, MCTs comprise between about 25 and about 75 weight percent of the structured lipid charge. Generally, the charged quantities of interesterification reactants correspond closely to the respective weight percents in the interesterified structured lipid. Preferably, the quantity of MCTs is between about 30 at about 60 weight percent, most preferably between about 35 and about 55 weight percent.

Also part of the charge for forming the structured lipids are so-called domestic oils. Domestic oils for the interesterification according to the invention include soybean oil, corn oil, cottonseed oil, canola oil, safflower oil, sunflower oil, peanut oil, olive oil, oil from grain plants, and identity preserved oils such as identity preserved canola oil and the like. Whichever edible oil is chosen, it will be a liquid oil. Hydrogenation typically need not be carried out. Oils of these types are well recognized as so-called long chain lipids. Chain lengths of these oils generally lie between C16 and C22, as will be generally appreciated in the art.

The charge of such domestic oil to the interesterification location or vessel comprises between about 75 and about 25 weight percent of the charge, and substantially the same level of long chain component is in the interesterified structured lipid. Preferably, this amount is between about 70 and about 40 weight percent, most preferably between about 65 and about 45 weight percent, based upon the weight of the charge or interesterified structured lipid.

With further reference to the domestic oils having chain lengths longer than the MCT reactant, advantageously they are preferably substantially unsaturated oils such as soybean, corn, cottonseed and canola, which are well known in the art as liquid oil commodities. Certain specialty oils also are encompassed within the preferred domestic oils. These include identity preserved canola oils and refined, bleached and deodorized high stable oils. Included is naturally high stable canola oil such as NATREON oil (trademark, available from Dow Agro Sciences, Canbra Foods), which is naturally higher in monounsatarated fats and in oleic fatty acid and lower in linolenic fatty acid. In this regard, Sornyk et al U.S. Pat. No. 5,965,755 and Lanuza et al. U.S. Pat. No. 6,169,190 are noted.

The chemical interesterification used in making the structured lipids of the invention involves charging the reactants into an interesterification reactor vessel. Such vessels have means for heating the reactants during agitation and under reduced pressure or vacuum conditions. The reaction is carried out in the presence of a suitable interesterification catalyst and typically proceeds rapidly to completion or substantial completion. Typically, the interesterification is a reaction to or toward complete randomization, which would equate to a degree of interesterification of 100% of the fatty acyl chains.

Interesterification catalysts include metal alkoxides, alkali metals, alkali metal alloys, and metal hydroxides. Alkoxides include alkali metal alkoxides, such as sodium methoxide, sodium ethoxide, potassium methoxide and potassium ethoxide. Alkali metals include sodium. Alkali metal alloys include sodium/potassium alloy, and metal hydroxides include alkali metal hydroxides such as sodium hydroxide and potassium hydroxide.

Once the interesterification has proceeded to form the desired structured lipid, steps can be taken to modify the conditions away from reaction conditions. This can include inactivating the catalyst, reducing the temperature, reducing the vacuum applied, ceasing agitation, or any combination of these changes. Means for accomplishing these changes will be appreciated by those skilled in the art.

Reaction temperatures range between about 80° C. and about 100° C. (about 160° F. to about 212° F.). A most suitable temperature at which to carry out the interesterification within the reaction vessel is approximately midway within this range. Vacuum conditions within the vessel range between about 5 mbar and about 100 mbar (between about 4 mm Hg and about 75 mm Hg). Preferably, the level is within the lower portion of this range, or less than about 40 mbar (about 30 mm Hg), most preferably at or below about 26.7 mbar (about 20 mm Hg).

Reaction time will range between about 30 minutes and about 2 hours. An especially suitable reaction time is about 45 minutes. This reaction time can be controlled, for example, by timed neutralization of the catalyst. Neutralization for a catalyst such as sodium methoxide can be accomplished with 0.7 weight percent of citric acid solution of 42% strength.

The interesterified structured lipid can be treated to remove any residual soaps and/or to remove all the color bodies if needed. These include filter aids and silica sources such as TRISYL® S-615 (trademark, available from W. R. Grace & Co.) used for the refining of vegetable oil. Color removal can be with a bleaching earth or the like. The structured lipid also typically will be subjected to deodorization in accordance with approaches generally known in the art.

In preparing the pan release products, the interesterification structured lipid typically is combined with other components which will be generally appreciated by those skilled in the art. In those situations where pan release spraying is by aerosol means, a propellant is included in the pan release composition. Other components which typically are included within aerosol spray formulation are short chain alcohols, most typically ethyl alcohol, food grade surfactants and emulsifiers such as a lecithin. Other additives can include phospholated mono and diglycerides (PMDs), which are suitable for cooking under rugged conditions such as barbeque grilling. Water can also be a component of these sprayable formulations.

One or more of these components can be present in spray formulations which are not of the aerosol type, for example pump sprayers, squeeze-activated sprayers, or industrial sprayers for large-scale food manufacturing. It will be appreciated that the structured lipids are very advantageously incorporated into aerosol formulations which must exhibit low viscosity and contain relatively high melting edible oils.

The interesterified structured lipid according to the invention is combined with components such as these, as may be necessary, in order to assist in propelling action characteristic of sprayed components. The structured lipid is the component which provides the primary pan release functions in such compositions. This lessens the importance of other typical components such as those noted above. The structured lipid provides the smoke point levels needed for a pan release product. The structured lipid also has the advantageous low viscosity needed for a composition to be delivered by some form of spraying. Higher viscosities would cause clogging of spray nozzles or other outlets.

Pan release compositions according to the invention include the structured lipid at levels between about 60 and about 100 weight percent, based upon the total weight of the pan release product. Typically the structured lipid will be present at between about 80 and about 95 weight percent.

With further reference to components in addition to the interesterified structured lipid according to the invention, specific details concerning other components for pan release compositions can be found in U.S. Pat. Nos. 3,928,056, 4,108,678, 4,371,451, 5,370,732, 5,374,434, 5,503,866, 5,662,956 and 6,210,743. As noted previously, each of these patents is incorporated by reference hereinto.

Especially in those products which are intended for aerosol delivery, one or more propellants will be included. These are generally categorized as pressurized gas, liquefied gas, soluble gas dissolved in the liquid of the product, and other propellant types. Perhaps the currently most common propellant is nitrous oxide. Another is carbon dioxide. Dimethyl ether also is a known propellant. Generally, conventional hydrocarbon propellants can be less than totally desirable for food uses. Fluorocarbons, which are normally gaseous, tend to be disfavored for environmental reasons and to governmental regulations. Depending upon the particular pan release composition being formulated, propellants can be at levels as high as 75% or above and as low as about 10% by weight, based upon the total weight of the product.

If lecithin is included, it typically would be present at a level lower than lecithin in pan release compositions in which lecithin is the primary anti-stick component. Lecithin products can vary somewhat in their make-up, depending upon their source and/or supplier. For example, soybean lecithin is obtained as a byproduct in the manufacture of soybean oil. Phosphatide or solids content varies within lecithin products. Generally, such phosphatide or solids content or contents are important to any lecithin function in a pan release composition. With these variables in mind, when lecithin is included in the present products, same will be at a level of between about 0.5 and about 15 percent by weight, based upon the total weight of the product.

Humectants are included in possible components of typical pan release compositions. Usually these will be at levels of about 4 percent or less by weight, based upon the total weight of the product. Examples include polyhydric alcohols such as glycerol, sorbitol, propylene glycol, and the like.

At times, a suspending agent can be included in the pan release product at relatively low levels. For example, stearates, silicates and the like can be included at levels on the order of about 0.5 to about 2 percent by weight, based upon the total weight of the pan release product.

Modifying agents also can be included in order to prepare a pan release product having certain sensory properties or shelf stability properties. These include flavorants, colorants, antioxidants, preservatives, inhibitors, and the like. Levels of use will depend upon the result desired and will be generally appreciated by those skilled in the art.

Some pan release compositions rely upon water as an inexpensive solvent which readily evaporates upon contact with a hot surface. At times, water can also perform the function of a carrier and/or as a component of an emulsion system. For example, when a lecithin component is included, water will be useful in partially hydrating the phosphatide portion of the lecithin material. Water also can serve as a humectant. Because of these wide variations in the function of water within a pan release composition and the manner by which the pan release composition is delivered, either on a consumer level or within an industrial food preparation operation, water amounts can very considerably. Some formulations will include water at a level approaching 75% by weight, based upon the total weight of the product composition. In other formulations, the amount can be on the order of 50% by weight or less. A somewhat general range is between about 0.2 and about 22 percent by weight, based upon the total weight of the product composition. When water is used purely as a humectant, it typically would be at a level of 1.5% or less by weight, based upon the total weight of the product.

Brookfield viscosity measurements for the compositions should be between about 20 and about 52 centipoise when measured at 20° C. with a No. 4 spindle at 50 rpm. Preferably, the range is between about 30 and about 50 centipoise, most preferably between about 35 and about 48 centipoise.

Examples now are provided in order to illustrate the concepts of the invention with a certain degree of specificity.

EXAMPLE 1

A batch reaction was carried out within a reactor vessel having heating means, agitation means and pressure reduction capabilities. The reactant charge was 50% by weight of a medium change triglyceride (NEOBEE® 1053) and 50% by weight of identity preserved canola oil. A sodium methoxide catalyst (95% pure) was added at 0.15 percent by weight of the edible oil reactant charge. The interesterification reaction was allowed to proceed for 45 minutes at a temperature of 90° C. and a pressure of 25.3 mbar (19 mm Hg). At the end of the reaction time, neutralization was carried out with 0.7% by weight of citric acid solution of 42% strength by weight. with 0.5% of bleaching earth and 0.5% of a filter aid in order to ensure that all color bodies were removed.

Deodorization was carried out as follows. The structured lipid was subjected to a temperature of about 230° C. under a vacuum of 2.66 mbar (2 mm Hg). Steam was introduced at the rate of 0.4 volume percent of steam per hour. Deodorization treatment time was four hours.

The structured lipid was analyzed and found to have the following characteristics. No soap was detected. The smoke point was 210° C. (410° F.). The viscosity was measured with a Brookfield viscometer at 20° C., using the No. 4 spindle at 50 rpm. The viscosity reading for this structured lipid was 22 centipoise.

Good product stability was indicated by a free fatty acids value of 0.03. The peroxide value was 0.2. The oxidative stability index (OSI) was 15.5 hours at 110° C. The solids fat content (SFC) at 10° C. was 0.32, indicating that the structured lipid was liquid at this temperature. The anisidine value was comfortably low, at 0.85. The color measurement according to PFX880 5¼ was 7.5Y/1.3R.

This structured lipid provided an excellent cooking spray component in a pan release composition including a conventional type of propellant system.

The same MCT and identity preserved canola oil in the same proportions were made up into a physical blend. The Brookfield viscosity at 20° C., with spindle No. 4 at 50 rpm, was 40 centipoise, and the smoke point was 154.4° C. (310° F.) The canola oil, prior to blending, had a viscosity of 68 centipoise measured in the same manner.

EXAMPLE 2

A structured lipid was made substantially in accordance with Example 1. The charge was 50% identity preserved canola oil and 50% NEOBEE® 1053 MCTs oil. Interesterification and deodorization proceeded. The structured lipid had a smoke point of 207° C. (405° F.). Further analysis showed an SFC at 10° C. of 0.55, an Iodine Value of 49.5 and an OSI of 10.65 hours at 110° C. Its peroxide value was less than 0.1, and the free fatty acids were at 0.02. C8 analysis was 18.54%, and C10 analysis was 17.41%, with percent trans being 0.84%. Analyzed total saturates was 41.93%. This structured lipid was formulated into a pan release composition containing 99.4 weight percent of the structured lipid and 0.6 weight percent of lecithin.

The Brookfield viscosity was 22 centipoise at 20° C., using spindle No. 4 at 50 rpm. The viscosity of the structured lipid formulated with 5.6% lecithin was 44 centipoise at 50 rpm. The viscosity of a commercial pan release composition (PAM®) was 40 centipoise at 50 rpm.

In a release test, the structured lipid and release formulation gave a value of 0.81 gram when subjected to a release test for determining fat content. The PAM® release product tested at 0.71 gram. By this release test, the product is delivered by aerosol spray for one second at a distance of 6 to 12 inches in front of an unheated 10 inch cooking pan. This quantity of product then is analyzed for fat content.

This pan release formulation was tested as follows. A cooking pan was heated to a surface temperature of about 157° C. (about 315° F.). The pan release composition (4 cc) was placed in the center of the pan and was allowed to heat for 30 seconds, the pan release composition being at about 160° C. (320° F.). An egg was cracked on top of the heated pan release composition. Cooking commenced for one minute and 30 seconds, after which the pan was tilted, and the cooked egg slid out of the pan and onto a plate.

The following observations were made. No sticking was observed in the pan during the cooking process. No residual materials were left in the pan. Tasting of the egg indicated good mouth lubricity and did not give off a greasy feeling. The overall taste was clean.

EXAMPLE 3

Chemical interesterification was carried out substantially in accordance with Example 1. The charges were 65 percent by weight of BUNGE® non-hydrogenated corn oil and 35 percent by weight of C8/C10 medium chain triglyceride. The resulting structured lipid was treated to remove soaps and subjected to deodorization. The color measurement was 8.0Y/1.0R.

Analysis showed that the Brookfield viscosity was 48 centipoise at 20° C. with a spindle No. 4 at 50 rpm. The smoke point was 214.5° C. (418° F.).

EXAMPLE 4

Soybean oil and MCTs were charged to a reaction vessel at a ratio of 65:35 of soy:MCT. The resulting interesterified structured lipid had a viscosity of 44 centipoise at 20° C. on the Brookfield viscometer with spindle No. 4 at 50 rpm. The smoke point was 213.3° C. (416° F.) . The color measurement was 13.0Y/2.0R. When made up into a physical blend product in the same proportions, the same oil and MCT had a Brookfield viscosity at 20° C., with spindle No. 4 at 50 rpm, of 56 cp, and the smoke point was 179° C. (354° F.). The soybean oil, prior to blending, had a viscosity of 60 cp measured in the same manner.

EXAMPLE 5

Interesterification was carried out on a charge of 32.5 weight percent corn oil, 32.5 weight percent cottonseed oil, and 35 weight percent MCTs. The corn oil had a Brookfield viscosity of 64 cp measured as in Example 1. After proceeding substantially in accordance with Example 1, the thus prepared structured lipid had a Brookfield viscosity at 20° C., with spindle No. 4 at 50 rpm, of 48 centipoise. The smoke point was 201° C. (394° F.). The color measurement was 22.0Y/2.9R. When made into a physical blend product in the same proportions, these same components gave a Brookfield viscosity of 56 cp and a smoke point of 176.7° C. (350° F.), measured in the same manner.

EXAMPLE 6

BUNGE® corn oil (65 weight percent) and 35 weight percent MCTs having 70% C10 were subjected to a randomizing interesterification reaction substantially in accordance with Example 1. The resulting structured lipid had a Brookfield viscosity of 48 cp, with the No. 4 spindle at 50 rpm, at 20° C. The smoke point was 199° C. (390° F.). The color measurement was 9.0Y/1.5R.

EXAMPLE 7

A charge into the interesterification process substantially in accordance with Example 1 was as follows: soybean oil at 40 weight percent, cottonseed oil at 25 weight percent, and MCTs at 35 weight percent. The resulting structured lipid had a Brookfield viscosity of 48 centipoise with spindle No. 4 at 50 rpm and at 20° C. The smoke point was 198° C. (388° F.). The color measurement was 22.0Y/3.3R. A physical blend product made of these same components in the same proportions had a Brookfield viscosity under the same conditions of 56 cp and a smoke point of 172° C. (342° F.).

EXAMPLE 8

A charge into the interesterification process substantially in accordance with Example 1 was as follows: soybean oil at 60 weight percent, cottonseed oil at 25 weight percent, and MCTs at 15 weight percent. The resulting structured lipid had a Brookfield viscosity of 40 centipoise with spindle No. 4 at 50 rpm and at 20° C. The smoke point was 203.3° C. (398° F.). The color measurement was 22.Y/3.5R. A physical blend of these same components in these proportions had a Brookfield viscosity of 48 cp and a smoke point of 183° C. (362° F.), measured in accordance with this Example.

EXAMPLE 9

Soybean oil and MCTs were charged to a reaction vessel at a ratio of 75:25 of soy:MCT. The resulting interesterified structured lipid had a viscosity of 44 centipoise at 20° C. on the Brookfield viscometer with spindle No. 4 at 50 rpm. The color measurement was 4.5Y/1.9R. The smoke point was 210° C. (410° F.). A physical blend of these components in these same proportions gave a Brookfield viscosity of 56 cp and a smoke point of 175.5° C. (348° F.), measured in accordance with this Example.

EXAMPLE 10

Canola oil (Natreon identity preserved oil) and MCTs were charged to a reaction vessel at a ratio of 60:40 of oil:MCT. The resulting interesterified structured lipid had a viscosity of 44 centipoise at 20° C. on the Brookfield viscometer with spindle No. 4 at 50 rpm. The smoke point was 197.8° C. (388° F.) . A physical blend product of these components at these proportions had a Brookfield viscosity of 48 cp and a smoke pint of 187.8° (370° F.), measured according to this Example.

EXAMPLE 11

Interesterification was carried out on a charge of 70 weight percent canola oil (Natreon oil) and 30 weight percent MCTs. After proceeding substantially in accordance with Example 1, the thus prepared structured lipid had a Brookfield viscosity at 20° C., with spindle No. 4 at 50 rpm, of 48 centipoise. The smoke point was 202° C. (396° F.). A same-proportion physical blend product of these had a Brookfield viscosity of 52 cp and a smoke point of 182.2° C. (360° F.) measured according to this Example.

EXAMPLE 12

BUNGE® corn oil (70 weight percent) and 30 weight percent MCTs were subjected to a randomizing interesterification reaction substantially in accordance with Example 1. The resulting structured lipid had a Brookfield viscosity of 48 cp, with the No. 4 spindle at 50 rpm, at 20° C. The smoke point was 214.4° C. (418° F.). A same-proportion physical blend of these had a Brookfield viscosity of 48 cp and a smoke point of 180° C. (356°) measured according to this Example.

EXAMPLE 13

A charge into the interesterification process substantially in accordance with Example 1 was as follows: canola oil at 60 weight percent and MCTs at 40 weight percent. The resulting structured lipid had a Brookfield viscosity of 40 centipoise with spindle No. 4 at 50 rpm and at 20° C. The smoke point was 194.4° C. (382° F.). A physical blend of these components in the same proportion, when tested according to this Example, gave a Brookfield viscosity of 44 cp and a smoke point of 175.5° C. (348° F.). Canola oil, before blending or reaction, had a viscosity of 64 cp, measured in the same manner.

EXAMPLE 14

A charge into the interesterification process substantially in accordance with Example 1 was as follows: canola oil at 70 weight percent and MCTs at 30 weight percent. The resulting structured lipid had a Brookfield viscosity of 40 centipoise with spindle No. 4 at 50 rpm and at 20° C. The smoke point was 212.2° C. (414° F.). A physical blend of these reactants in the same proportion, when tested according to this Example, gave a Brookfield viscosity of 48 cp and a smoke point of 180° C. (356° F.).

It will be understood that the embodiments of the present invention which have been described are illustrative of some of the applications of the principles of the present invention. Numerous modifications may be made by those skilled in the art without departing from the true spirit and scope of the invention.

What is claimed is:

1. A pan release cooking composition, comprising:

an interesterified structured lipid which is a reaction product of an interesterification reactant charge, said reactant charge having between about 25 and about 75 weight percent, based upon the total weight of the charge, of a medium chain triglyceride having fatty acid chains from C6 to C12 in length, reacted with between about 75 and about 25 weight percent, based upon the total weight of the charge, of a long chain domestic oil having fatty acid chains of at least C16 in length; and a propellant for facilitating delivery by spraying of the pan release cooking composition.

wherein said structured lipid has a Brookfield viscosity at 20° C. of between about 20 and about 52 centipoise; and wherein said structured lipid has a smoke point of at least about 195° C. (at least about 383° F.).

2. The pan release composition in accordance with claim 1, wherein said structured lipid has a Brookfield viscosity at 20° C. of between about 30 and about 50 centipoise.

3. The pan release composition in accordance with claim 1, wherein said structured lipid has a Brookfield viscosity at 20° C. of between about 35 and about 48 centipoise.

4. The pan release composition in accordance with claim 1, wherein said structured lipid has a smoke point of at least about 205° C. (greater than about 400° F.).

5. The pan release composition in accordance with claim 1, wherein said structured lipid has a smoke point of between about 196° C. and about 221° C. (between about 385° F. and about 430° F.).

6. The pan release composition in accordance with claim 1, wherein said structured lipid comprises at least about 60% by weight of the pan release composition, based upon the total weight of the composition.

7. The pan release composition in accordance with claim 1, wherein said structured lipid comprises between about 80% and about 95% by weight of the pan release composition, based upon the total weight of the composition.

8. The pan release composition in accordance with claim 1, wherein said medium chain triglyceride amount is between about 30% and about 60% by weight of the interesterification charge, and the amount of the domestic oil is between about 70% and about 40% by weight of the charge.

9. The pan release composition in accordance with claim 1, wherein said medium chain triglyceride amount is between about 35% and about 55% by weight of the interesterification charge, and the amount of the domestic oil is between about 65% and about 45% by weight of the charge.

10. The pan release composition in accordance with claim 1, wherein said propellant is included in the composition at a level of at least about 10% by weight, based upon the total weight of the pan release composition.

11. The pan release composition in accordance with claim 1, further including at least about 0.5% by weight of a lecithin, based upon the total weight of the pan release composition.

12. The pan release composition in accordance with claim 1, further including not greater than about 4% by weight of a humectant, based upon the total weight of the pan release composition.

13. The pan release composition in accordance with claim 1, further including at least about 2% by weight of a suspending agent, based upon the total weight of the pan release composition.

14. The pan release composition in accordance with claim 1, further including at least about 0.2 weight percent water, based upon the total weight of the pan release composition.

15. The pan release composition in accordance with claim 1, wherein said medium chain triglyceride is selected from the group consisting of caprylic triglyceride, capric triglyceride, and combinations thereof.

16. The pan release composition in accordance with claim 1, wherein said domestic oil is selected from the group consisting of soybean oil, corn oil, cottonseed oil, canola oil, olive oil, peanut oil, safflower oil, sunflower oil, oil from grain plants, and combinations thereof.

17. A pan release cooking composition, comprising:

an interesterified structured lipid which is a reaction product of an interesterification reactant charge, said reactant charge having between about 25 and about 75 weight percent, based upon the total weight of the charge, of a medium chain triglyceride having fatty acid chains from C6 to C12 in length, reacted with between about 75 and about 25 weight percent, based upon the total weight of the charge, of a long chain domestic oil having fatty acid chains of at least C16 in length;

said structured lipid has a Brookfield viscosity at 20° C. of between about 20 and about 52 centipoise; and said structured lipid has a smoke point of at least about 195° C. (at least about 383° F.).

18. The pan release composition in accordance with claim 17, wherein said structured lipid has a smoke point of at least about 205° C. (greater than about 400° F.).

19. The pan release composition in accordance with claim 17, wherein said medium chain triglyceride amount is between about 30% and about 60% by weight of the interesterification charge, and the amount of the domestic oil is between about 70% and about 40% by weight of the charge.

20. The pan release composition in accordance with claim 17, wherein said medium chain triglyceride amount is between about 35% and about 55% by weight of the interesterification charge, and the amount of the domestic oil is between about 65% and about 45% by weight of the charge.

21. The pan release composition in accordance with claim 17, further including at least about 0.5% by weight of a lecithin, based upon the total weight of the pan release composition.

22. The pan release composition in accordance with claim 17, further including at least about 0.2 weight percent water, based upon the total weight of the pan release composition.

23. The pan release composition in accordance with claim 17, further including between about 0 and about 10% by weight of a propellant, based upon the total weight of the composition, at least about 0.5% by weight of lecithin, based upon the total weight of the composition, between about 0 and about 4% by weight of a humectant, based upon the total weight of the composition, and between about 0 and about 2% by weight of a suspending agent, based upon the total weight of the composition.

24. The pan release composition in accordance with claim 17, wherein said medium chain triglyceride is selected from the group consisting of caprylic triglyceride, capric triglyceride, and combinations thereof.

25. The pan release composition in accordance with claim 17, wherein said domestic oil is selected from the group consisting of soybean oil, corn oil, cottonseed oil, canola oil, olive oil, peanut oil, safflower oil, sunflower oil, oil from grain plants, and combinations thereof.

26. A method for making a pan release cooking composition, comprising:

providing a medium chain triglyceride having carbon chain lengths of between C6 and C12;

providing domestic oil having carbon chain lengths of between C16 and C22;

introducing a reactant charge to a reaction location, the reactant charge including between about 25% and about 75% by weight of the medium chain triacylglyceride and between about 75% and about 25% by weight of said domestic oil, based upon the total weight of the reactant charge;

interesterifing said reactant charge into an interesterified structured lipid;

combining said interesterified structured lipid with a propellant to provide a pan release cooking composition;

wherein said pan release composition has a Brookfield viscosity at 20° C. of between about 20 and 52 centipoise; and wherein said pan release composition has a smoke point of at least about 195° C. (at least about 385° F.).

27. The method in accordance with claim 26, comprising adding at least about 60% by weight of the structured lipid, based upon the total weight of the pan release composition.

28. The method in accordance with claim 26, further including adding at least about 0.5% by weight of lecithin, based upon the total weight of the pan release composition.

29. The method in accordance with claim 26, further including adding at least about 0.2% by weight of water, based upon the total weight of the pan release composition.

30. A method for using a medium chain triglyceride in a pan release cooking composition, comprising:

providing a medium chain triglyceride having carbon chain lengths of between C6 and C12;

providing domestic oil having carbon chain lengths of between C16 and C22;

introducing a reactant charge to a reaction location, the reactant charge including between amount 25% and about 75% by weight of the medium chain triglyceride and between about 75% and about 25% by weight of said domestic oil, based upon the total weight of the reactant charge;

interesterifing said reactant charge into an interesterified structured lipid;

combining said interesterified structured lipid with a propellant to provide a pan release cooking composition having a Brookfield viscosity at 20° C. of between about 20 and 52 centipoise and a smoke point of at least about 195° C. (at least about 383° F.)

spraying the pan release composition onto a surface adapted to contact a food; and heating the food so as to cook or bake the food in the presence of the pan release cooking composition.

31. The method in accordance with claim 30, comprising adding at least about 60% by weight of the structured lipid, based upon the total weight of the pan release composition.

32. The method in accordance with claim 30, further including adding at least about 0.5% by weight of lecithin, based upon the total weight of the pan release composition.

33. The method in accordance with claim 30, further including adding at least about 0.2% by weight of water, based upon the total weight of the pan release composition.

34. A pan release cooking composition, comprising:

an interesterified structure lipid which is a reaction product of an interesterification reactant charge, said reactant charge having between about 15 and 75 weight percent, based upon the total weight of the charge, of a medium chain triglyceride having fatty acid chain from C6 to C12 in length, reacted with between about 85 and about 25 weight percent, based upon the total weight of the charge, of a long chain domestic oil having fatty acid chains of at least C16 in length;

a propellant for facilitating delivery by spraying of the pan release cooking composition; and wherein said structured lipid has a Brookfield viscosity at 20° C. of between about 20 and about 52 centipoise and has a smoke point of at least about 195° C. (at least about 383° F.).

35. The pan release composition in accordance with claim 34, wherein said structure lipid has a Brookfield viscosity at 20° C. of between about 30 and about 50 centipoise.

36. The pan release composition in accordance with claim 34, wherein said structure lipid comprises at least about 60% by weight of the pan release composition, based upon the total weight of the composition.

37. A method for making a pan release cooking composition, comprising:

providing a medium chain triglyceride having carbon chain lengths of between C6 and 12;

providing domestic oil having carbon chain lengths of between C16 and C22;

introducing a reactant charge to a reactant location, the reactant charge including between amount 15% and about 75% by weight of the medium chain triglyceride and between about 85% and about 25% by weight of said domestic oil, based upon the total weight of the reactant charge;

interesterifing said reactant charge into an interesterified structured lipid;

combining said interesterified structure lipid with a propellant to provide a pan release cooking composition;

wherein said pan release composition has a Brookfield viscosity at 20° C. of between about 20 and about 52 centipoise; and whrein said pan release composition has a smoke point of at least about 195° C. (at least about 383° F.).

38. A method for using a medium chain triglyceride in a pan release cooking composition, comprising:

providing a medium chain triglyceride having carbon chain lengths of between C6 and C12;

providing domestic oil having carbon chain lengths of between C16 and C22;

introducing a reactant charge to a reactant location, the reactant charge including between about 15% and about 75% by weight of the medium chain triglyceride and between 85% and about 25% by weight of said domestic oil, based upon the total weight of the reactant charge;

interesterifing said reactant charge into an interesterified structured lipid;

combining said interesterified structured lipid with a propellant to provide a pan release cooking composition having a Brookfield viscosity at 20° C. of between 20 and about 52 centipoise and a smoke point of at least about 195° C. (at least about 383° F.);

spraying the pan release composition onto a surface adapted to contact a food; and heating the food so a to cook or bake the food in the presence of the pan release cooking composition.

* * * * *

UNITED STATES PATENT AND TRADEMARK OFFICE
CERTIFICATE OF CORRECTION

PATENT NO. : 6,793,959 B2  
APPLICATION NO. : 10/100449  
DATED : September 21, 2004  
INVENTOR(S) : Dilip K. Nakhasi and Roger L. Daniels Page 1 of 1

It is certified that error appears in the above-identified patent and that said Letters Patent is hereby corrected as shown below:

In the Specification:

References Cited:

3,072,487, delete "1/1963" insert --4/1960--.

4,425,164, delete "1/1984" insert --10/1984--.

Col. 2, line 55, delete "at" insert --and--.

Col. 3, line 10, delete "advantageous" insert --advantages--.

Col. 4, line 9, delete "at" insert --and--.

Col. 6, line 33, delete "same" and insert --some--.

Col. 6, line 64, delete "very" insert --vary--.

Col. 9, line 62, delete "pint" insert --point--.

Col. 14, line 34, delete "whrein" insert --wherein--.

Col. 14, line 58, delete "a" insert --as--.

Signed and Sealed this

Third Day of October, 2006

JON W. DUDAS  
*Director of the United States Patent and Trademark Office*